(12) United States Patent
Boyland et al.

(10) Patent No.: US 10,873,154 B2
(45) Date of Patent: Dec. 22, 2020

(54) HYGIENIC MOTOR CABLE VENT CONNECTOR APPARATUS AND METHOD

(71) Applicant: KOLLMORGEN CORPORATION, Radford, VA (US)

(72) Inventors: John Boyland, Christiansburg, VA (US); Steve McClellan, Blacksburg, VA (US); Tom England, Dublin, VA (US); Tony Nozzi, Dublin, VA (US); Mark Beneski, Blacksburg, VA (US); Bill Sutton, Aurora, IL (US); Reid Hunt, Radford, VA (US); Valerie Garrison, Blacksburg, VA (US); Gene Matthews, Blacksburg, VA (US); Jerry Brown, Radford, VA (US); Andy Hansbrough, Blacksburg, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 587 days.

(21) Appl. No.: 15/248,538

(22) Filed: Aug. 26, 2016

(65) Prior Publication Data
US 2017/0062971 A1     Mar. 2, 2017

Related U.S. Application Data

(60) Provisional application No. 62/210,996, filed on Aug. 28, 2015.

(51) Int. Cl.
*H02K 5/10* (2006.01)
*H01R 13/52* (2006.01)
(Continued)

(52) U.S. Cl.
CPC ....... *H01R 13/5216* (2013.01); *H01R 13/005* (2013.01); *H01R 24/28* (2013.01);
(Continued)

(58) Field of Classification Search
CPC ........ H02K 5/00; H02K 11/00; H02K 205/09; H02K 2205/09; H01R 13/00; H01B 7/00
See application file for complete search history.

(56) References Cited

U.S. PATENT DOCUMENTS 2,776,385 A      1/1957   Modrey
2,812,456 A  *  11/1957   Lubberhuizen .......... H02K 9/24
                                                         310/88
(Continued)

FOREIGN PATENT DOCUMENTS

EP           1320170 A2      2/2005

OTHER PUBLICATIONS

International Search Report and Written Opinion issued in corresponding international application No. PCT/US2016/48963, dated Jan. 9, 2017.

*Primary Examiner* — Dang D Le
(74) *Attorney, Agent, or Firm* — Day Pitney LLP (57) ABSTRACT

A cable vent connector configured for venting an electric motor is provided. The cable vent connector includes an input for receiving a motor-side cable that includes a vent tube and a plurality of electrical conductors; a body configured for venting the vent tube to a local atmosphere, thus permitting an interior of the electric motor to reach pressure equilibrium; and a port for connecting the plurality of electrical conductors with a drive-side cable configured to drive the electric motor. A venting system and a production system are disclosed.

18 Claims, 6 Drawing Sheets

(51) Int. Cl.
  *H01R 24/28*  (2011.01)
  *H02K 11/00*  (2016.01)
  *H01R 13/00*  (2006.01)
  *H02K 5/22*   (2006.01)
  *H01R 107/00* (2006.01)
  *H01B 7/00*   (2006.01)

(52) U.S. Cl.
  CPC .............. *H02K 5/10* (2013.01); *H02K 5/225* (2013.01); *H02K 11/0094* (2013.01); *H01B 7/0072* (2013.01); *H01R 2107/00* (2013.01); *H02K 2205/09* (2013.01)

(56) References Cited

U.S. PATENT DOCUMENTS

| | | | |
|---|---|---|---|
| 2,910,524 A | | 10/1959 | Schaffhauser |
| 3,570,483 A | * | 3/1971 | Stram ................ A61C 17/0217 128/200.19 |
| 3,571,486 A | * | 3/1971 | Kennedy ............. H01B 7/0072 174/11 R |
| 3,635,599 A | * | 1/1972 | Bryant ................ F04D 15/0077 310/87 |
| 4,006,784 A | * | 2/1977 | Dudek ................ B25B 23/1456 173/170 |
| 5,510,577 A | * | 4/1996 | Corrigan ............. H01R 13/523 174/74 R |
| 6,089,838 A | * | 7/2000 | Schoenmeyr ....... F04B 43/0054 417/572 |
| 2003/0197424 A1 | * | 10/2003 | Frey ........................ H02K 5/10 303/3 |

\* cited by examiner

HYGIENIC MOTOR CABLE VENT CONNECTOR APPARATUS AND METHOD

CROSS REFERENCE TO RELATED APPLICATIONS

This patent application is filed under 35 U.S.C. § 111(a) and claims the benefit of priority under 35 U.S.C. § 119(e) to U.S. Provisional Patent Application Ser. No. 62/210,996, filed Aug. 28, 2015, which is incorporated by reference herein in its entirety for any purpose whatsoever.

BACKGROUND OF THE INVENTION

1. Field of the Invention

The subject matter disclosed herein relates generally to motor technology and more particularly to vent connector apparatus for ventilation of a hygienic motor.

2. Description of the Related Art

A variety of commercial and industrial applications require availability of motorized power in a clean or "hygienic" environment. As one example, consider a meat processing and packing facility. Typically, a meat processor requires availability of saws and other types of heavy equipment while having to meet standards for food handling. More specifically, production requirements call for the equipment to be outfitted with motors having substantial output and competitive pressure requires that the equipment have minimal maintenance needs with a high degree of availability. Unfortunately, hygiene standards for food processing complicate use of such equipment and typically prevent operators from reaching a desired degree of equipment availability.

For example, consider that motors used in hygienic applications such as food processing are typically subject to frequent high temperature and high-pressure cleaning cycles. Cleaning cycles may involve use of corrosive cleaning agents as well as rigorous rinsing cycles. This has given rise to motors specifically designed to operate in hygienic environments.

A typical hygienic motor includes an easy to clean exterior, such as a housing with any other exposed surfaces made from stainless steel. Openings such as those needed for ventilation of the motor, are sealed to prevent infiltration and growth of bacteria. Sealing the motor also serves to protect the motor internals while facilitating and enduring harsh repeated cleaning cycles.

While a completely sealed motor design might seem to be advantageous for preventing ingress of bacteria, a sealed motor design presents a number of disadvantages. For example, with the sealed design, it is difficult to maintain equilibrium between internal motor pressure and atmospheric pressure. A pressure differential between the inside of a motor and the local atmosphere is a common result of normal motor heating and cooling associated with operation, and is only exacerbated by cleaning cycles. Unfortunately, the frequent pressure differential leads to excessive wear and maintenance expense.

Unfortunately, in conventional hygienic applications, pressure equilibrium within a motor housing cannot be achieved simply by providing a vent on the motor housing, since the vent opening would leave the motor exposed to the frequent cleaning cycles and thus damage motor internals.

What are needed are solutions that provide for hygienic motors that maintain a sealed condition, while permitting pressure within the motor to be maintained in equilibrium with atmospheric pressure. Preferably, the solutions are simple to install, cost effective, easy to clean, and simple to maintain.

SUMMARY OF THE INVENTION

In one embodiment, a cable vent connector configured for venting an electric motor is provided. The cable vent connector includes an input for receiving a motor-side cable that includes a vent tube and a plurality of electrical conductors; a body configured for venting the vent tube to a local atmosphere, thus permitting an interior of the electric motor to reach pressure equilibrium; and a port for connecting the plurality of electrical conductors with a drive-side cable configured to drive the electric motor.

The body may include a hollow inner section adapted to receive a vent element; the vent element may include a breathable membrane configured to pass air and substantially prevent migration of moisture. The port may include a drive cable guide insert; and the drive cable guide insert may be configured to at least one of mate with an adapter of the drive-side cable and retain the plurality of electrical conductors in a fixed geometry. The input may include at least one of a ferrule and a stress relief, the input configured for cooperatively retaining the motor-side cable and retaining the motor-side cable in the body. At least one of the input, the body and the port may be fabricated from stainless steel.

In another embodiment, a venting system for an electric motor designed for hygienic use is disclosed. The system includes a motor-side cable configured for connecting to the motor at a proximal end thereof; and a cable vent connector coupled to a distal end of the motor-side cable, the motor-side cable including a vent tube and a plurality of electrical conductors; the cable vent connector including a body configured for communicating air of the vent tube to a local atmosphere, thus permitting an interior of the electric motor to reach pressure equilibrium with the environment at the location of the cable vent connector; and a port for connecting the plurality of electrical conductors with a drive-side cable configured to drive the electric motor.

The motor-side cable may be configured with one of a cable port for connecting to the cable vent connector and a cable port for connecting to a hygienic enclosure for a conventional motor. The motor-side cable may include a vent tube and a plurality of electrical conductors disposed within a length thereof. The motor-side cable may include a length adequate to locate the cable vent connector outside of a hygienic cleaning zone. The venting system may further include a drive-side cable mated to the cable vent connector, and the drive-side cable may include another plurality of electrical conductors configured for connecting with the plurality of electrical conductors of the motor-side cable. The plurality of electrical conductors may be configured to conduct at least one of power and control signals to the electric motor.

In yet another embodiment, a production system with a hermetically sealed electric motor is provided. The system includes a production tool configured for using the hermetically sealed electric motor to provide mechanical energy; and a venting system for venting an internal portion of the hermetically sealed electric motor, the venting at a remote location.

The hermetically sealed electric motor may be deployed in a hygienic cleaning zone. The production tool may be used in a setting that includes one of: food and beverage; packaging and converting; pharmaceutical; material forming; medical laboratory and automation; robotics; printing;

labeling; aerospace; tire and rubber; postal sorting; automated vehicle; and oil and gas industry. The electric motor may include one of: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and another type of motor. The electric motor may be powered by one of alternating current (AC) and direct current (DC).

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus that provide for venting of an electric motor. In the exemplary embodiment, the electric motor is hygienically sealed for use in a hygienic environment (and is referred to as a "hygienic motor"). Venting of the hygienic motor may be accomplished without compromising the hygienic seal. That is, in general, the teachings herein provide for remote venting of the hygienic motor. As an introduction, an example of a system employing the hygienic motor is illustrated in FIG. 1.

Generally, a hygienic seal of a hygienic motor prevents intrusion of the external environment into the motor. The hygienic seal may also be viewed as a "hermetic seal." A hermetic seal is the quality of the motor being airtight (excluding passage of air, oxygen, or other gases). Specific test methods and conditions to qualify the seal may be determined as needed. Hygienic motors, as disclosed herein, may maintain a seal meeting hygienic or hermetic standards, with the exception of the venting described herein.

Figure 1:
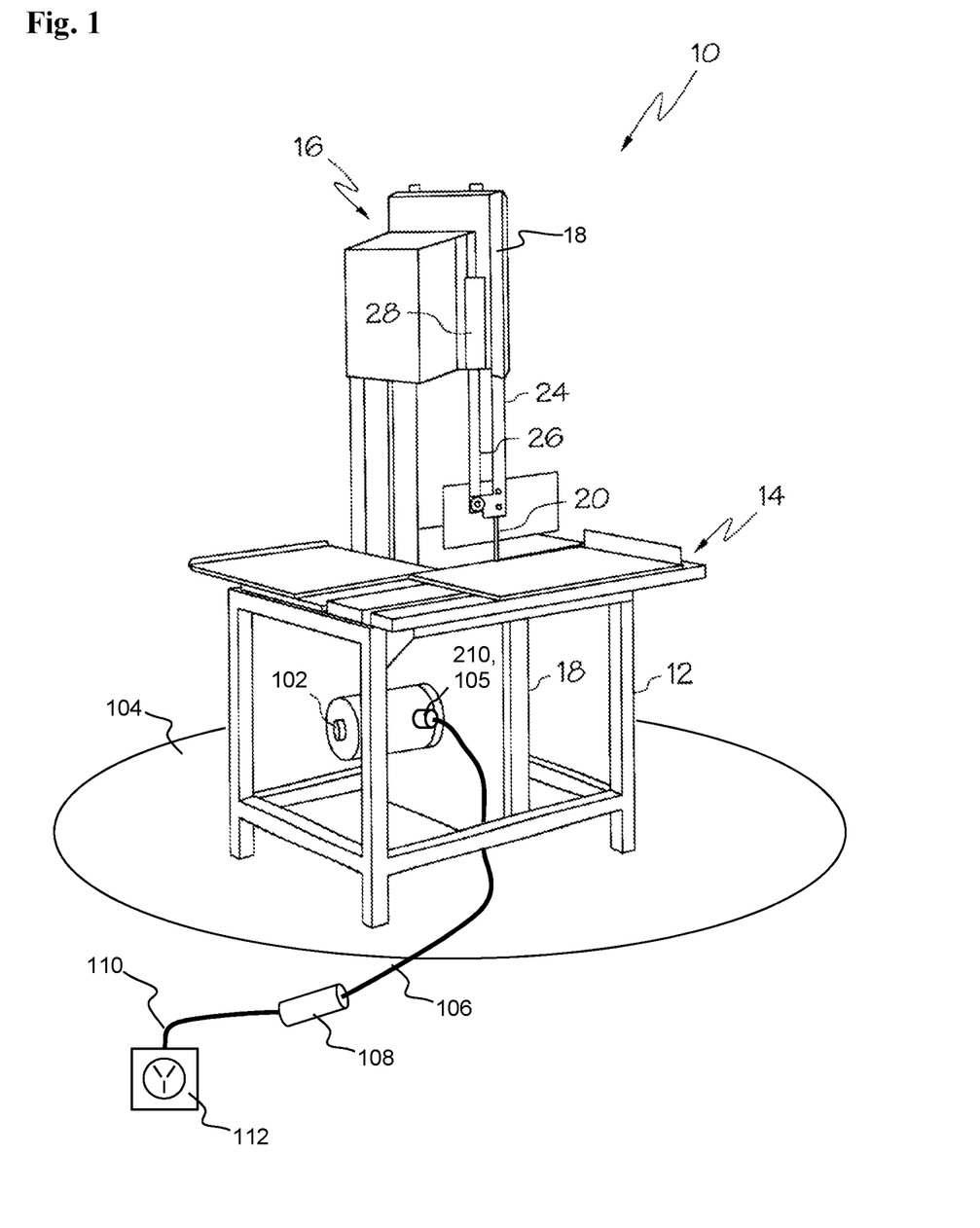
FIG. 1 is a perspective view of a food processing station that includes a hygienic motor system according to the teachings herein.

Turning to FIG. 1, an exemplary embodiment of a food processing station 10 is shown. In this example, the food processing station 10 includes band saw 16. Food processing apparatus such as band saw 16 are commonly used for cutting meat products of a variety of sizes. In the exemplary embodiment, band saw 16 includes a frame 12 upon which is mounted a support surface 14 for positioning meat products to be cut. A housing 18 extends above support surface 14 and housing 18 also extends below support surface 14. A band saw blade 20 passes through a plane defined by support surface 14 and extends around wheel members (not shown) located with housing 18 for being drivingly rotated by such wheel members. Drive motor 102 may be connected for rotating a drive wheel in housing 18. A blade guard 24 extends around the cutting edge of blade 20 and downward from housing 18 toward support surface 14. Blade guard 24 is connected to a guide bar 26 which extends upward toward housing 18 and through a guide assembly 28 which is mounted to housing 18. Guide bar 26 is slidably positioned within guide assembly 28 such that guide bar 26 can be moved upward or downward through such guide assembly if a sufficient moving force is applied thereto. However, with no moving force applied guide assembly 28 engages guide bar 26 with sufficient force to hold guide bar 26 and blade guard 24 in position. Because blade guard 24 is connected to guide bar 26 for movement therewith, the length of band saw blade 20 which is protected by the blade guard 24 can be varied by varying the position of guide bar 26 relative to guide assembly 28.

The food processing station 10 shown in FIG. 1 is surrounded by a hygienic cleaning zone 104. The hygienic cleaning zone 104 is an area that is subjected to cleaning according to applicable standards for hygiene. In some embodiments, the hygienic cleaning zone 104 covers a radius of at least two (2) meters. Configuration of the hygienic cleaning zone 104 depends on a variety of factors, such as the nature of the operation, applicable hygienic standards, size and complexity of the motor and processing equipment involved and other such aspects.

Generally, the drive motor 102 is connected to a cable system. In the example of FIG. 1, the cable system includes a motor-side cable 106 and a drive-side cable 110. The motor-side cable 106 encloses a plurality of electrical conductors and also encloses a vent tube. A motor connector 105 is disposed on a proximal end of the motor-side cable 106 and is used to connect the electrical conductors and vent tube of the motor-side cable 106 to a cable port 210 of the drive motor 102. Once connected, a combination of the motor connector 105 and the cable port results in a hygienic seal of the motor-side cable 106 with the drive motor 102.

Disposed between the motor-side cable 106 and the drive-side cable 110 is a cable vent connector 108. In this embodiment, a distal end of the motor-side cable 106 terminates into the cable vent connector 108. Among other things, the cable vent connector 108 facilitates venting of the drive motor 102.

When deployed, the cable vent connector 108 is located outside of the hygienic cleaning zone 104. Thus, the cable vent connector 108 is not subject to the harsh environments within the hygienic cleaning zone 104. The cable vent connector 108 thus permits pressure within the drive motor 102 to reach equilibrium with the atmospheric pressure (at the cable vent connector 108).

Figure 2:
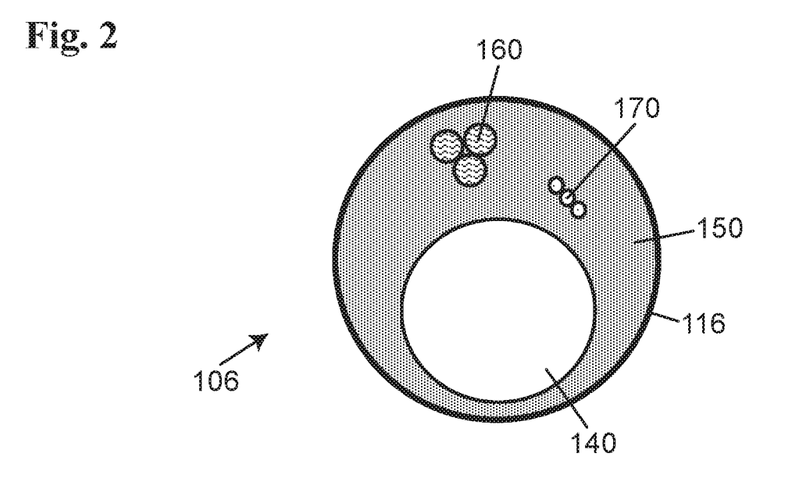
FIG. 2 is a cross-sectional diagram of a motor-side cable for the system of FIG. 1.

In FIG. 2, an example of a cross section for the motor-side cable 106 is shown. In this example, the motor-side cable 106 includes an exterior sheathing 116. The exterior sheathing 116 may include any type of cable sheathing deemed appropriate. Most often, the exterior sheathing 116 is fabricated from a material that is both durable and easily cleaned. Disposed within the exterior sheathing 116 is insulation and/or filler material 150. The filler material 150 may be provided to maintain strength and physical form for the motor-side cable 106. A substantial portion of the cross section of the motor-side cable 106 may be taken up by a vent tube 140. The vent tube 140 may be fabricated from any material deemed appropriate. A smaller portion of the cross section of the motor-side cable 106 may be taken up by power conductors 160. Generally, the power conductors 160 conduct electrical power required to power the drive motor 102 and/or any other equipment as may be associated with the band saw 16 and other equipment as may be coupled to the drive motor 102 within the hygienic cleaning zone 104. A smaller portion of the cross section of the motor-side cable 106 may be taken up by a communications channel 170. Generally, the communications channel 170 may include electrical conductors as deemed appropriate for conducting control signals. The control signals may be used to control power the drive motor 102 and/or any other equipment as may be associated with the band saw 16 and within the hygienic cleaning zone 104. Examples of control signals include start, stop, brake, and speed control signals.

Using the vent tube 140 of the motor-side cable 106, air within the drive motor 102 is freely vented, thus permitting the volume within the drive motor 102 to maintain an appropriate ambient pressure, despite being otherwise sealed. That is, with the motor-side cable 106, air can be conducted from within a housing 202 of the drive motor 102 to the cable vent connector 108.

The cable vent connector 108 is adapted to be coupled with a drive-side cable 110. In this example, the drive cable 110 includes conductors that transmit power and output signals from a drive unit 112, through the cable vent connector 108 to the motor-side cable 106. Generally, the drive unit 112 may include a power supply as well as a communications interface for operating the drive motor 102. The drive-side cable 110 may terminate in a standard conductor pin configuration, a proprietary configuration or in any configuration deemed appropriate to mate with the cable vent connector 108.

The cable vent connector 108 thus performs a number of advantageous functions. For example, the cable vent connector 108 enables safe venting of the housing 202 in an area outside of the hygienic cleaning zone 104. The cable vent connector 108 also couples output of the drive-side cable 110 with corresponding input on the motor-side cable 106. Another significant advantage of the cable vent connector 108 is that venting is provided without the need to run a single cable from the drive motor 102 to the drive unit 112, making the motor-side cable 106 and drive-side cable 110 more easily replaceable (for example, since the cable segments have reduced length). In some embodiments, more than one cable vent connector 108 may be used in series with additional intermediate cable segments. Further, a drive motor 102 may be configured with more than one motor-side cable 106.

Figure 3:
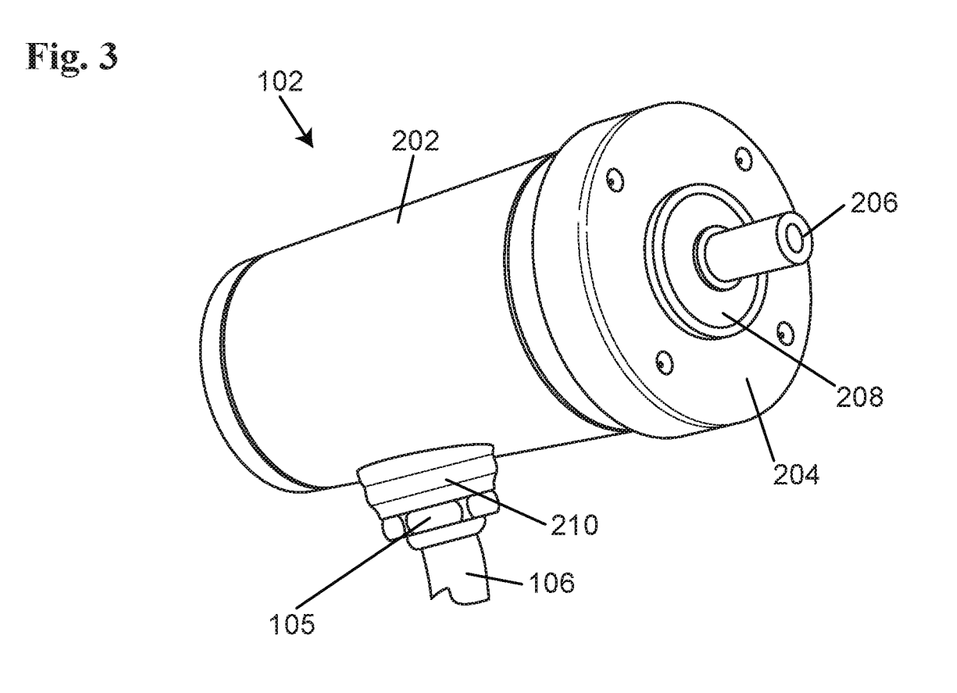
FIG. 3 is a perspective view of a hygienic motor.

Turning to FIG. 3, aspects of an exemplary drive motor 102 are shown. In this illustration, the drive motor 102 includes housing 202 with a generally cylindrical section that is enclosed by end sections (e.g., 204). A shaft 206 extends through an end section 204 and is hermetically sealed by way of gasket seal 208. Disposed in the housing 202 is a cable port 210. The cable port 210 is configured for mating with a motor connector 105. The motor connector 105 is disposed on a proximal end of the motor-side cable 106. When the motor connector 105 of the motor-side cable 106 is secured in the cable port 210, the drive motor 102 is sealed from an external environment (except, of course, as discussed herein with regard to venting with the motor-side cable 106).

Figure 4A:
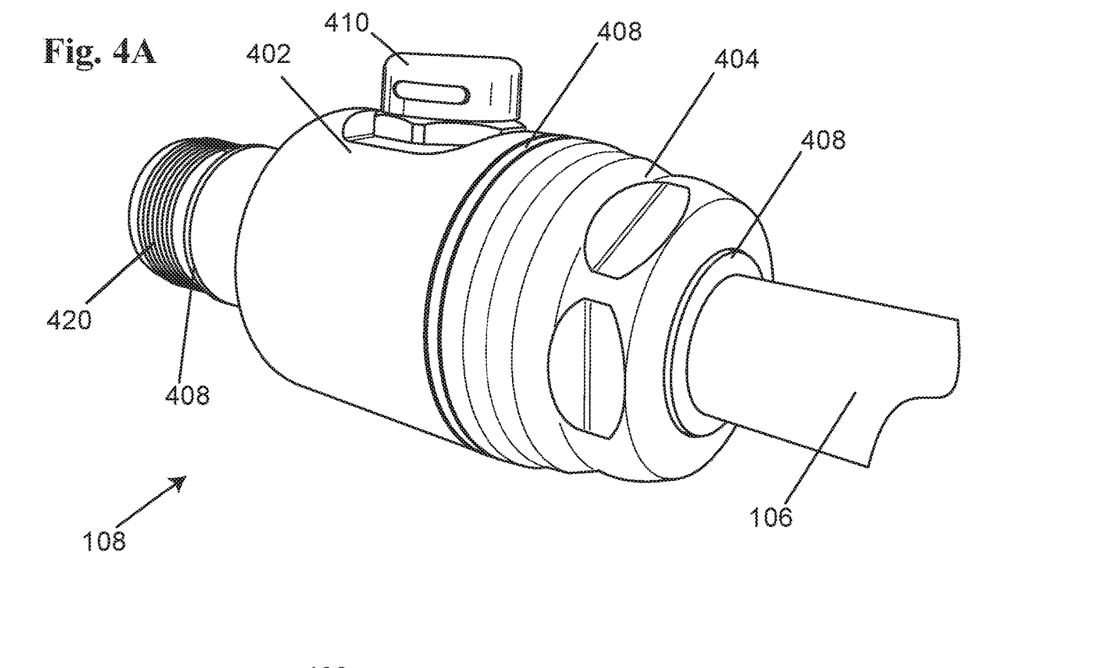
FIGS. 4A, 4B and 4C, collectively referred to herein as FIG. 4, are perspective views of an embodiment of a cable vent connector according to the teachings herein.
Figure 4B:
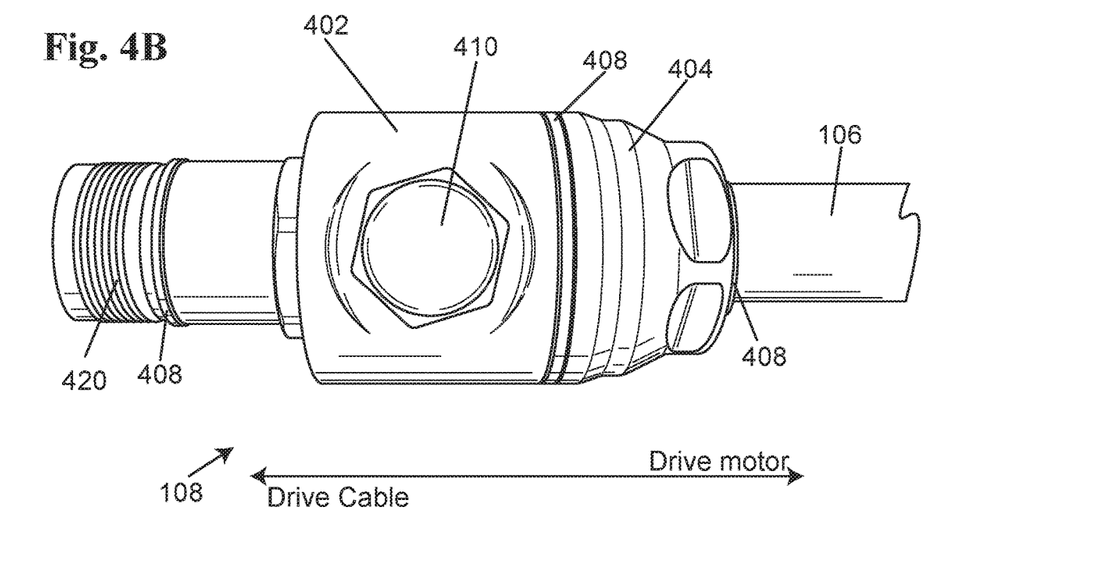
Figure 4C:
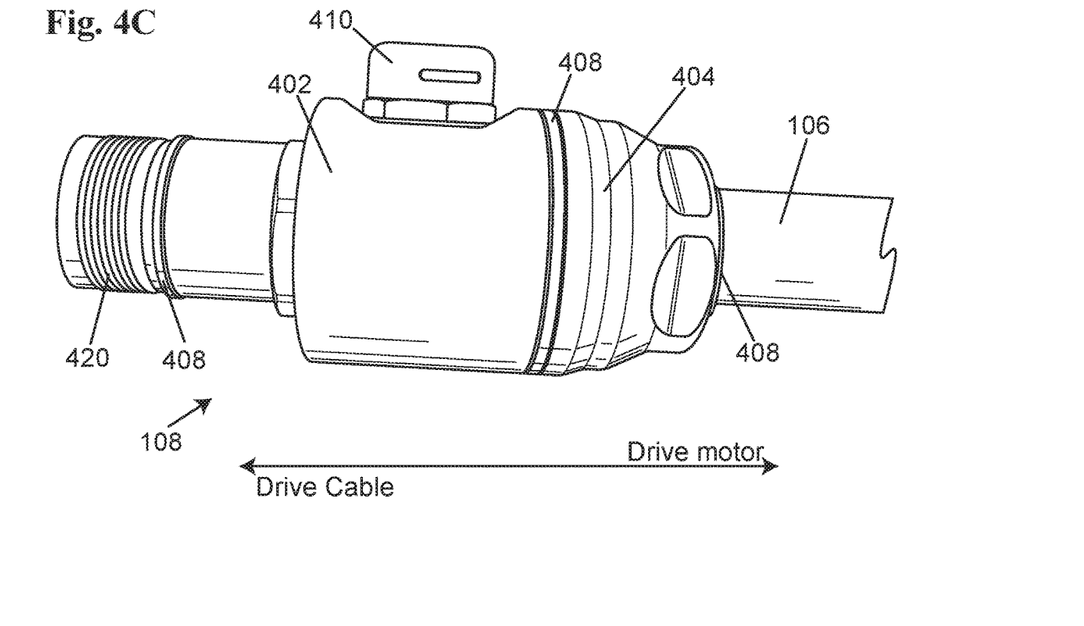

FIGS. 4A-4C show perspective, top and side views (respectively) of an exemplary embodiment of the cable vent connector 108. As shown, the cable vent connector 108, which may be made from stainless steel, includes a generally cylindrical housing as body 402. The cable vent connector 108 also includes a first threaded strain relief 404 adapted to couple to the cylindrical housing of the body 402 and firmly retain the motor-side cable 106. An o-ring or similar seal 408 may be provided at the interfaces between the strain relief 404 and the body 402. Additional o-rings or seals 408 may be disposed between other components of the cable vent connector 108 as shown. Generally, the seals 408 prevent ingress of moisture.

A vent element 410 is exposed to the local atmosphere and is in fluidic communication with the vent tube 140 of the motor-side cable 106. In this example, the vent element 410 protrudes from the side of the body 402. The vent element 410 may include a membrane, such as a breathable waterproof membrane (not shown), such as a GORE-TEX® polyetrafluoroethylene (ePFTE) membrane manufactured by W.L. Gore & Associates. The membrane material allows air to travel freely while substantially preventing entrance of moisture from the atmosphere.

The cable vent connector 108 includes a drive cable coupling or port 420. The port 420 provides for coupling of the cable vent connector 108 (and thus the motor-side cable 106) with the drive cable 110. The port 420 is shown as having a threaded body, however, any style of coupling deemed suitable may be used.

Figure 5:
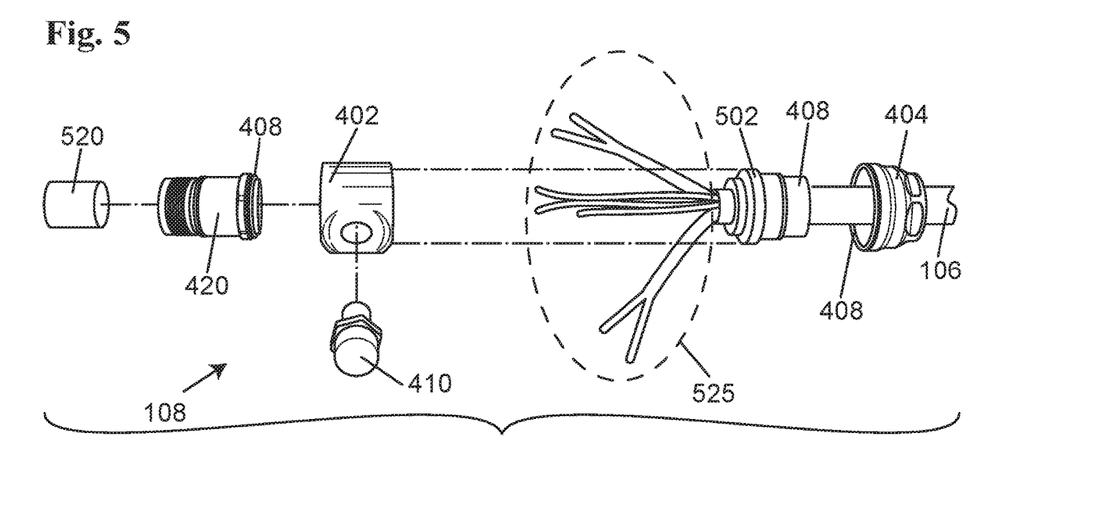
FIG. 5 is an exploded view of the cable vent connector of FIG. 4.

FIG. 5 provides an exploded view of the exemplary embodiment of the cable vent connector 108. As shown, the cable vent connector 108, includes the body 402 which has a vent. The vent element 410 is configured to protect the vent by mounting to the body 402 and over the vent. In this example, the port 420 is a separate element that is mateable with the body 402. In some other embodiments, the port 420 and the body 402 are of unitary construction. A drive cable guide insert 520 may be inserted into the port 420 and serve as a receiving area for electrical contacts (not shown) of the drive cable 110.

As stated above, the motor-side cable 106 includes a plurality of electrical conductors 525. The electrical conductors 525 include the power conductors 160 and the communications channel 170, as shown in FIG. 2.

A ferrule 502 may be disposed over the sheathing 116 of the motor-side cable 106 and provide for retention of the strain relief 404 as well as mating with the body 402. A seal 408 may be provided within the ferrule 502 and between the ferrule 502 and the sheathing 116. The seal 408 for the ferrule 502 may be provided in the form of a sleeve and made from suitable material, such as silicone rubber.

Ends of the electrical conductors 525 may be terminated with appropriately sized terminations. The terminations may be inserted through the body 402 and the drive cable coupling 420 and into the drive cable guide 520. In addition to providing other functions, the drive cable guide 520 thereby provides for proper geometry of the electrical conductors 525 and alignment with counterpart conductors in the drive cable 110.

Figure 6A:
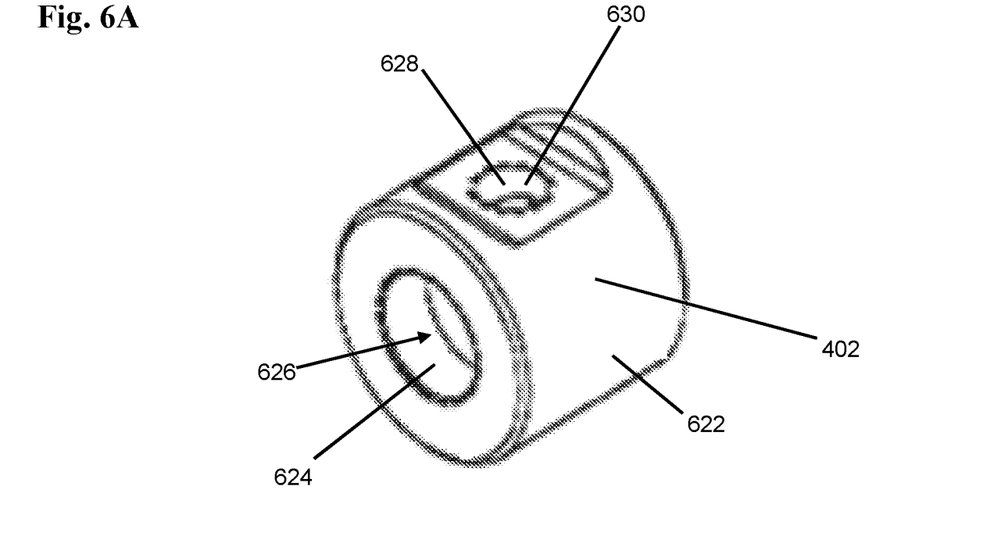
FIGS. 6A, 6B and 6C, collectively referred to herein as FIG. 6, are diagrammatic views of elements of the cable vent connector of FIGS. 4 and 5.
Figure 6B:
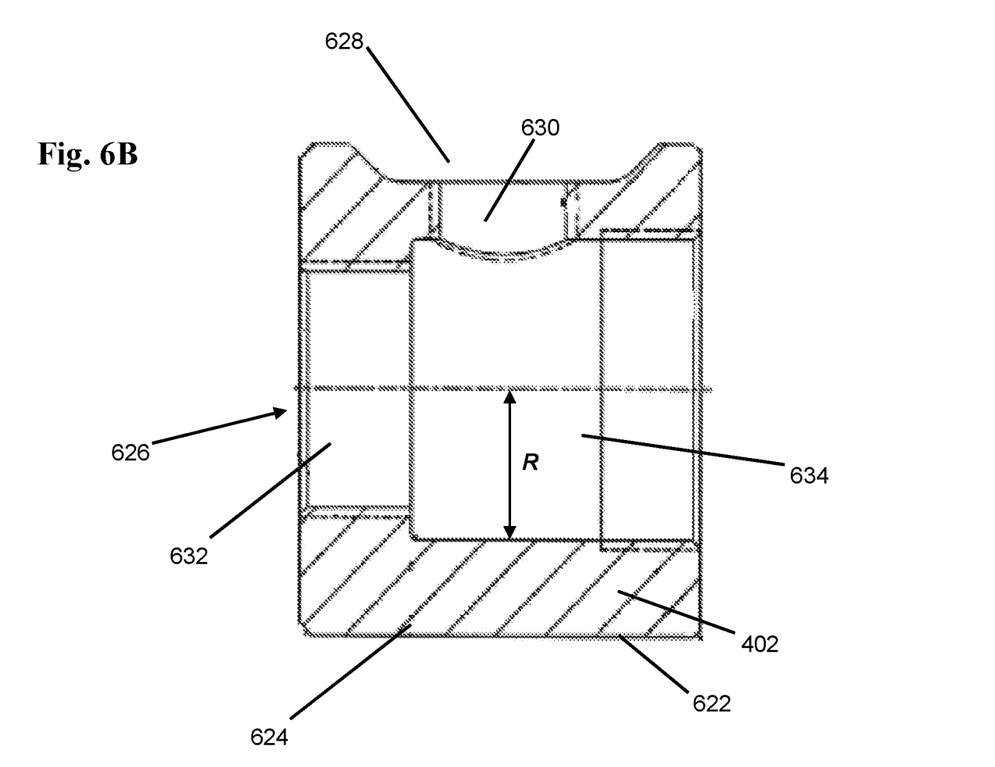
Figure 6C:
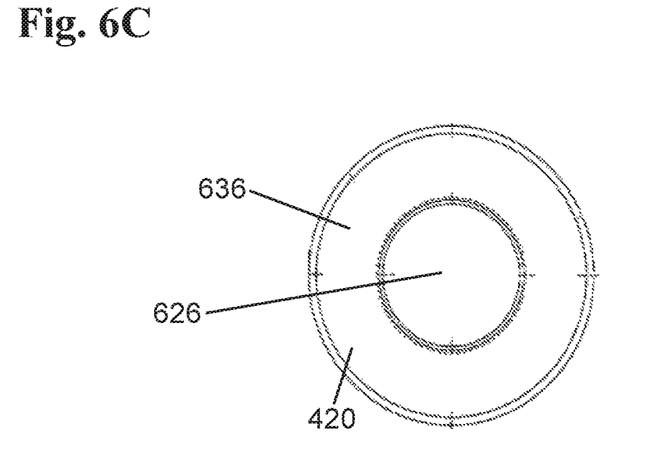

Aspects of an exemplary embodiment of the body 402 are shown in more detail with regard to FIG. 6.

In FIG. 6, perspective, cross-sectional and side views of the body 402 are shown, respectively. Referring to FIG. 6A, the body 402 is formed generally as a truncated annular tube, and includes an outer surface 622, and an inner surface 624 enclosing a hollow inner section 626. Portions of the inner surface 624 may be threaded to receive threaded strain relief port elements. A recessed vent seat 628 is positioned on a section of the outer surface 622. The vent seat 628 includes a generally flat area for bearing the vent element 410 and includes hole 630, which may be threaded, for securely coupling a threaded section of the vent element 410 to the body 402. The threaded section of the vent element 410 includes a passage exposed to air within the central element and thus forms an air passage between the inner section of the body 402 and the external atmosphere. In the cross-sectional view of FIG. 6B, it can be seen that a radial width of hollow inner section 626 of the body may not be uniform, and may include a first section 632 having a relatively smaller radius and a second section 634 having a relatively larger radius. The difference between the radii is adapted to conform to the radii of the different threaded strain relief elements which may be inserted and secured within the respective sections of the body 402. FIG. 6C provides an end view of the body 402 showing an end surface 636 and the hollow inner section 626. The end surface 336 may abut and form a seal with the strain relief 404 and the drive cable coupling 420.

The drive cable guide insert 520 may be fitted securely (e.g., by threading, snap-fit) into the port 420. When assembling the system, electrical connections carried within a terminal adapter of the drive cable 110 may be inserted into the drive cable guide insert 520 and a threaded stress relief thereof secured to the port 420 simply through turning the stress relief onto the port 420. This results in a secure mating of the cable vent adapter 108 with the drive cable 110.

Figure 7:
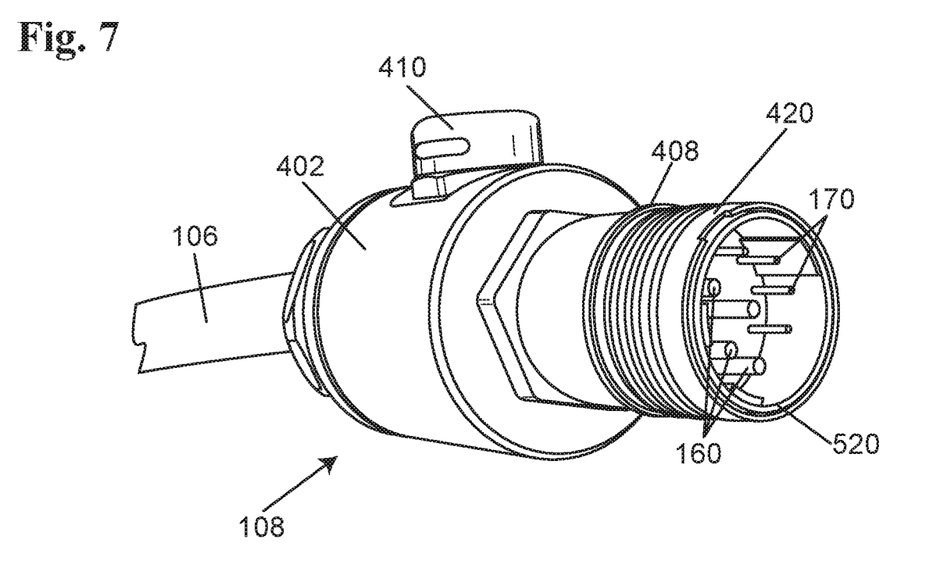
FIG. 7 is an end view of the cable vent connector of FIGS. 4, 5 and 6.

An end-view of the cable vent connector 108 is provided in FIG. 7. As may be seen particularly well in this view, the drive cable coupling 420 may be threadably secured to the body 402. Additionally, the drive cable guide insert 520 serves as a receiving area for an adapter of the drive cable 110 (adapter not shown), and provides for alignment of the electrical connections 525 (i.e., the power conductors 160 and the communications channel 170).

Having thus introduced aspects of the invention, some additional features, embodiments and considerations are now set forth.

Although the food processing station is shown as including a band saw, any type of equipment deemed appropriate may make use of the drive motor as disclosed herein. Further, the drive motor need not be deployed in a food processing station. For example, the drive motor may be used in industries or settings involved with food and beverage; packaging and converting; pharmaceutical; material forming; medical laboratory and automation; robotics; printing; labeling; aerospace; tire and rubber; postal sorting; automated vehicles; oil and gas; and any other environment deemed appropriate.

In this example, drive motor is a "hygienic motor." That is, the drive motor is designed to withstand the rigors of operation and periodic cleaning in an environment where standards for hygiene are imposed. As an example, the Food and Drug Administration (FDA) has set forth Current Good Manufacturing Practices (CGMP) for meat and poultry manufacturing equipment design. See "Good Manufacturing Practices (GMPs) for the 21$^{st}$ Century—Food Processing, Appendix A" Aug. 9, 2004. In this guidance, the FDA has suggested standards (referred to as "preventive controls") for processing equipment. These standards include: the processing equipment should be of sanitary design; it must be cleanable down to the microbiological level; it must be made of compatible materials; it must be accessible for inspection, maintenance, cleaning, and sanitation; it must be self-draining (i.e., does not allow for product or liquid collection); it must have its hollow areas hermetically sealed; it must be free of niches; it must have sanitary operational performance; it must have its maintenance enclosures hygienically designed; it must be hygienically compatible with other plant systems; and it must have a validated cleaning and sanitizing protocol. Of course, a variety of other standards, rules or regulations may be applicable and/or promulgated by other agencies or rule making bodies.

A variety of sanitizing agents may be used to sanitize equipment such as the drive motor 102. Examples include agents containing quaternary ammonium compounds (QACs), such as peroxyacetic acid, iodine, or chlorine. A variety of other agents are known and widely used.

The drive motor may include any type of motor deemed appropriate. For example, the drive motor be driven by alternating current (AC) or direct current (DC). For example, the drive motor may include, without limitation: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and any one or more of a variety of other types of motors. The drive motor may include any type of material deemed appropriate. For example, stainless steel may be used. As another example, polymeric materials may be used and may include bactericides disposed therein.

Although illustrated in FIG. 1 as being on the floor of a production area, a suitable length may be added to the motor-side cable such that the cable vent connector may be maintained in an appropriate place (such as hanging above the production area).

The teachings herein may be used to supply a kit for retrofit of existing equipment. For example, a suitable enclosure (not shown) may be provided that provides for hygienic sealing of a standard motor. In this embodiment, the hygienic enclosure may be configured to hygienically seal the standard motor from the environment, and is therefore configured with a cable port that is externally similar to that on the drive motor, while internally providing conventional connections to the standard motor.

In some embodiments, the drive motor is used in a setting that does not involve a "hygienic cleaning zone." For example, in some embodiments, a hermetically sealed electric motor as described herein (that is, sealed in all respects other than through the vent tube) may be immersed, such as in a liquid. More specific example include motors deployed downhole, in tanks and those that are otherwise submersed.

It should be noted that venting of the hygienic motor, as described herein, is generally with regard to equalizing pressure or avoiding pressure differentials. In some embodiments, the teachings herein may be adapted for other purposes, such as to provide some degree of cooling. For example, the cable vent connector may be adapted with a powered supply of air that results in the carrying away of heat from the drive motor. In this embodiment, it may be appropriate to include two motor-side cables, such that there is an air entrance and separate exhaust, thus creating an air flow.

It should be noted that some of the terminology set forth herein may be in agreement, or only partially an agreement with terminology set forth in the prior related provisional patent application. One skilled in the art will recognize the various uses of terms and be able to make the distinctions. However, if a conflict should exist, terminology is set forth in this disclosure shall prevail. It should be recognized that some adjustment and terminology has been provided to simplify explanation. No conflicts in terminology should be construed or inferred.

Terms of orientation are used herein merely for purposes of convention and referencing, and are not to be construed as limiting. For example, the terms "proximal" and "distal" are used in relation to the drive motor and the hygienic cleaning zone. However, it is recognized these terms could be used with reference to a user outside of the hygienic cleaning zone. Accordingly, no limitations are implied or to be inferred.

Standards for performance, materials, assembly or other such parameters are to be judged by a designer, manufacturer, user, owner, operator or other similarly interested party. No particular requirements for any standards are implied or to be inferred by the disclosure here.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The usage of the term "exemplary" is to be construed as meaning one of many possible embodiments. The term "exemplary" is not to be construed as being necessarily indicative of a superior or superlative embodiment, although, in some instances this may be the case.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cable vent connector configured for venting an electric motor, the cable vent connector comprising:
    an input for receiving a motor-side cable that comprises a vent tube and a plurality of electrical conductors, wherein the input comprises at least one of ferrule and a stress relief, the input configured for cooperatively retaining a motor-side cable and retaining the motor-side cable in a body;
    a body configured for venting the vent tube to a local atmosphere, thus permitting an interior of the electric motor to reach pressure equilibrium;
    a port for connecting the plurality of electrical conductors with a drive-side cable configured to drive the electric motor; and
    a vent element configured to be in fluidic communication with the vent tube of the input, wherein the vent element comprises a membrane configured to allow air to travel freely and prevent entrance of atmospheric moisture.

2. The cable vent connector as in claim 1, wherein the body comprises a hollow inner section adapted to receive a vent element.

3. The cable vent connector as in claim 2, wherein the vent element comprises a breathable membrane configured to pass air and substantially prevent migration of moisture.

4. The cable vent connector as in claim 1, wherein the port comprises a drive cable guide insert.

5. The cable vent connector as in claim 4, wherein the drive cable guide insert is configured to at least one of mate with an adapter of the drive-side cable and retain the plurality of electrical conductors in a fixed geometry.

6. The cable vent connector as in claim 1, wherein at least one of the input, the body and the port are fabricated from stainless steel.

7. A venting system for an electric motor designed for hygienic use, the system comprising:
    a motor-side cable configured for connecting to the motor at a proximal end thereof;
    a cable vent connector coupled to a distal end of the motor-side cable, the motor-side cable comprising a vent tube and a plurality of electrical conductors, the cable vent connector comprising:
        a body configured for communicating air of the vent tube to a local atmosphere, thus permitting an interior of the electric motor to reach pressure equilibrium with the environment at the location of the cable vent connector;
        a port for connecting the plurality of electrical conductors with a drive-side cable configured to drive the electric motor;
        a vent element configured to be in fluidic communication with the vent tube of the input, wherein the vent element comprises a membrane configured to allow air to travel freely and prevent entrance of atmospheric moisture; and
        an input for receiving the motor-side cable, the input comprising at least one of ferrule and a stress relief and configured for cooperatively retaining the motor-side cable and retaining the motor-side cable in the body.

8. The venting system as in claim 7, wherein the motor-side cable is configured with one of a cable port for connecting to the electric motor and a cable port for connecting to a hygienic enclosure for a conventional motor.

9. The venting system as in claim 7, wherein the motor-side cable comprises a vent tube and a plurality of electrical conductors disposed within a length thereof.

10. The venting system as in claim 7, wherein the motor-side cable comprises a length adequate to locate the cable vent connector outside of a hygienic cleaning zone.

11. The venting system as in claim 7, further comprising a drive-side cable mated to the cable vent connector.

12. The venting system as in claim 11, wherein the drive-side cable comprises another plurality of electrical conductors configured for connecting with the plurality of electrical conductors of the motor-side cable.

13. The venting system as in claim 7, wherein the plurality of electrical conductors are configured to conduct at least one of power and control signals to the electric motor.

14. A production system with a hermetically sealed electric motor, the system comprising:

a production tool configured for using the hermetically sealed electric motor powered by drive electronics to provide mechanical energy; and a venting system for venting an internal portion of the hermetically sealed electric motor, the venting at a remote location between the electric motor and the drive electronics, wherein the venting system comprises;

an input for receiving a motor-side cable that comprises a vent tube and a plurality of electrical conductors, wherein the input comprises at least one of ferrule and a stress relief, the input configured for cooperatively retaining a motor-side cable and retaining the motor-side cable in a body;

a body configured for venting the vent tube to a local atmosphere, thus permitting an interior of the electric motor to reach pressure equilibrium;

a port for connecting the plurality of electrical conductors with a drive-side cable configured to drive the electric motor; and a vent element configured to be in fluidic communication with the vent tube of the input, wherein the vent element comprises a membrane configured to allow air to travel freely and prevent entrance of atmospheric moisture.

15. The production system as in claim 14, wherein the hermetically sealed electric motor is deployed in a hygienic cleaning zone.

16. The production system as in claim 14, wherein the production tool is used in a setting that comprises one of: food and beverage; packaging and converting; pharmaceutical; material forming; medical laboratory and automation; robotics; printing; labeling; aerospace; tire and rubber; postal sorting; automated vehicle; and oil and gas industry.

17. The production system as in claim 14, wherein the electric motor comprises one of: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and another type of motor.

18. The production system as in claim 14, wherein the electric motor is powered by one of alternating current (AC) and direct current (DC).

* * * * *